United States Patent
Rameau et al.

(10) Patent No.: US 9,703,903 B2
(45) Date of Patent: Jul. 11, 2017

(54) DESIGNING A FOLDED SHEET OBJECT

(71) Applicant: Dassault Systemes, Velizy Villacoublay (FR)

(72) Inventors: Jean-Francois Rameau, Lisses (FR); Pascal Hebrard, Ville d'Avray (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 341 days.

(21) Appl. No.: 14/308,029

(22) Filed: Jun. 18, 2014

(65) Prior Publication Data

US 2014/0379111 A1    Dec. 25, 2014

(30) Foreign Application Priority Data

Jun. 20, 2013  (EP) .................................... 13305841

(51) Int. Cl.
*G06F 17/50* (2006.01)

(52) U.S. Cl.
CPC .......... *G06F 17/5009* (2013.01); *G06F 17/50* (2013.01); *G06F 2217/06* (2013.01); *G06F 2217/38* (2013.01); *G06F 2217/42* (2013.01)

(58) Field of Classification Search
None
See application file for complete search history.

(56) References Cited

U.S. PATENT DOCUMENTS

| | | | |
|---|---|---|---|
| 8,830,223 B2* | 9/2014 | Evans | G06F 17/50 345/419 |
| 2008/0065359 A1* | 3/2008 | Rudolph | G06F 7/49989 703/2 |
| 2010/0138021 A1* | 6/2010 | Hindman | G06F 17/50 700/98 |
| 2012/0158369 A1* | 6/2012 | Bachrach | G06F 17/50 703/1 |

OTHER PUBLICATIONS

Kato, J. et al., "Automatically Making Origami Diagrams", *Graphics Recognition, Recent Advances and New Opportunities* [LNCS], pp. 1-8 (Sep. 20, 2007).

Mullineux, G. and Matthews, J., "Constraint-based simulation of carton folding operations", *Computer Aided Design*, 42(3): 257-265 (Mar. 1, 2010).

Zarkandi, et al., "Singularity Analysis of Single-DOF Spherical Mechanisms Using Instantaneous Poles", IJRRAS, 5(1): 35-42 (Oct. 2010).

Chiang, C.H., "Kinematics of spherical mechanisms," Cambridge University Press, (Cover Page and Table of Contents) (1988).

Esko ArtiosCAD User Guide, 963 pages; Jun. 2012: http://help.esko.com/docs/en-us/artioscad/12/userguide/pdf/EAC12_UserGuide_en-us.pdf.

EPO Search Report (dated Oct. 23, 2013) in EP Application No. 13 30 5841, 1 page.

* cited by examiner

*Primary Examiner* — Ryan Jarrett
(74) *Attorney, Agent, or Firm* — Hamilton, Brook, Smith & Reynolds, P.C.

(57) ABSTRACT

It is provided a computer-implemented method for designing a folded sheet object, comprising the steps of providing (Continued)

(S10) panels separated by bend lines, including at least four adjacent panels forming a cycle and separated by concurrent bend lines, with predetermined angles between successive bend lines; and determining (S20) a control law linking the angles between the adjacent panels of the cycle, as a function of the predetermined angles between successive bend lines. Such a method improves the design of a folded sheet object.

12 Claims, 9 Drawing Sheets

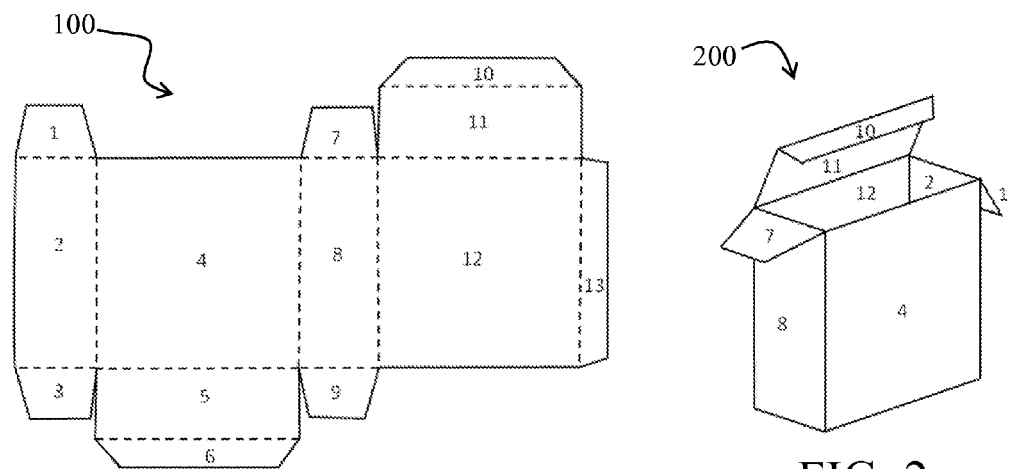
FIG. 1
FIG. 2
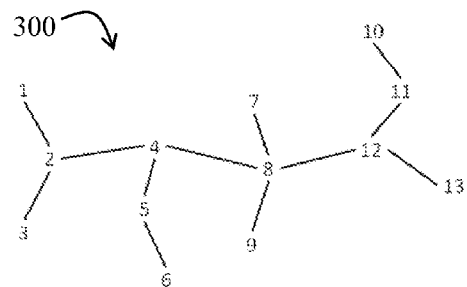
FIG. 3
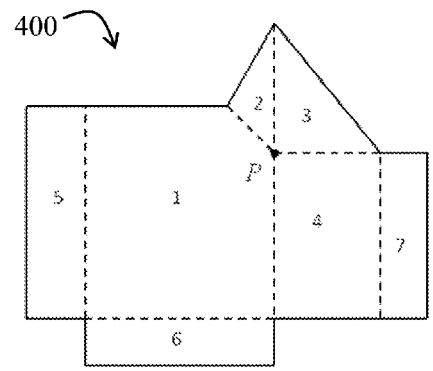
FIG. 4
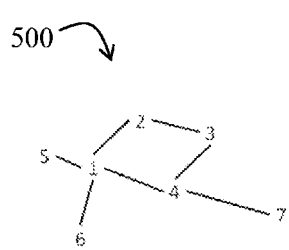
FIG. 5
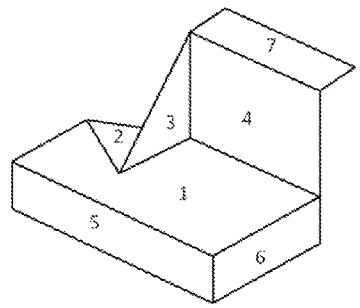
FIG. 6

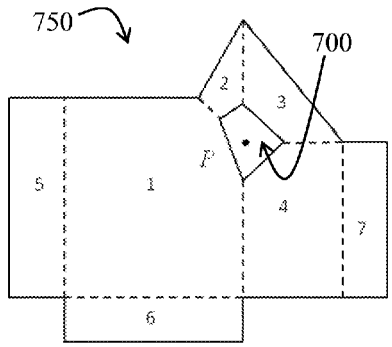

FIG. 7

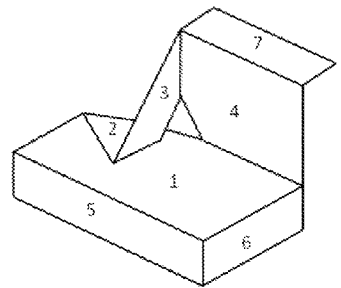

FIG. 8

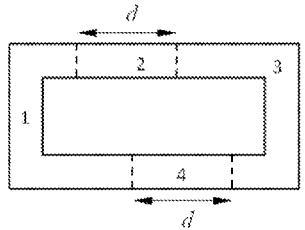

FIG. 9

FIG. 10

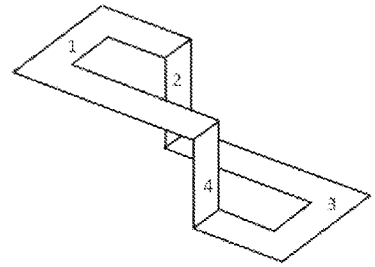

FIG. 11

| providing panels separated by bend lines, including at least four adjacent panels forming a cycle and separated by concurrent bend lines, with predetermined angles ($\alpha_i$) between successive bend lines | S10 |
|---|---|

↓

| determining a control law linking the angles ($\beta_i$) between the adjacent panels of the cycle, as a function of the predetermined angles ($\alpha_i$) between successive bend lines | S20 |
|---|---|

FIG. 12

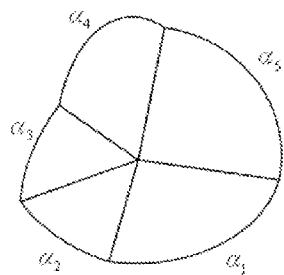
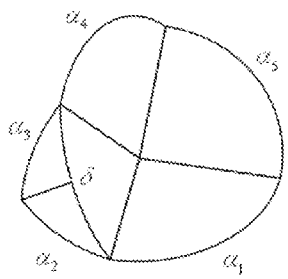
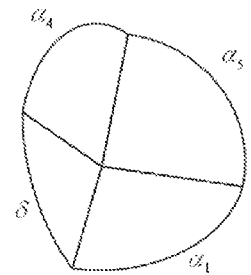
FIG. 37  FIG. 38  FIG. 39
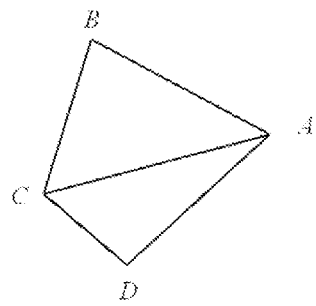
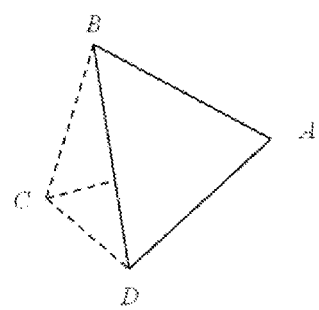
FIG. 40  FIG. 41
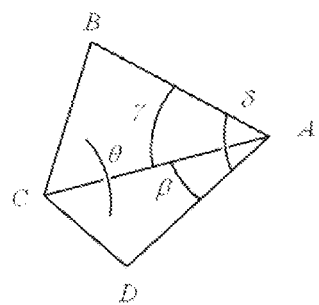
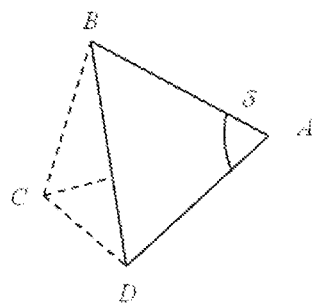
FIG. 42  FIG. 43

DESIGNING A FOLDED SHEET OBJECT

RELATED APPLICATION(S)

This application claims priority under 35 U.S.C. §119 or 365 to Europe, Application No. 13305841.2, filed Jun. 20, 2013. The entire teachings of the above application(s) are incorporated herein by reference.

FIELD OF THE INVENTION

The invention relates to the field of computer programs and systems, and more specifically to a method, system and program for designing a folded sheet object, as well as a folded sheet object obtainable by said method and a data file storing said folded sheet object.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such systems, the graphical user interface (GUI) plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some CAD systems now deal with packaging design. Packaging design systems may typically allow to define the shape of a flat carton board sheet and the arrangement of bend lines on said sheet in such a way that, according to a folding procedure, which may also be a matter of packaging design, the flat sheet changes itself into a three dimensional box that is able to contain some kind of goods. Packaging design CAD systems include for example ArtiosCAD software (registered trademark). ArtiosCAD includes geometric tools for a user to interactively define the outside shape, bend lines and panels of a flat carton board sheet as well as the folding procedure and the resulting three-dimensional shape of the package. For the sake of comprehensiveness, it is noted that ArtiosCAD also includes other functions related to packaging design (drawing, artwork, flexible package, layout for manufacturing) that are out of the scope of the present discussion.

FIG. 1 illustrates the typical flat view of a three dimensional box, carton board sheet 100, designed by ArtiosCAD. Dotted lines represent bend lines. Solid lines represent boundaries of the planar carton board sheet. Portions of sheet 100 bounded by dotted and/or solid lines are named panels. By definition, two panels are said to be adjacent if they share a bend line. Panels are numbered from 1 to 13 in the figures. FIG. 2 illustrates three-dimensional box 200 obtained by folding carton board sheet 100 of FIG. 1. Only visible panels of FIG. 1 are tagged with numbers on FIG. 2.

The key point of state of the art packaging design systems is related to the bend lines arrangement: each bend line can be folded independently. Formally, this means that the panels' adjacency graph is acyclic. The panels' adjacency graph is a non-directed graph defined as follows. Vertices are panels' numbers and arcs capture the adjacency relationship: an arc joins panel number i and panel number j if the said panels are adjacent (meaning that they share a bend line). From the mathematical point of view, the flat carton board sheet corresponds to a planar graph and the panels' adjacency graph is its dual graph. FIG. 3 illustrates panels' adjacency graph 300 of carton board sheet 100 of FIG. 1. It is clearly acyclic. The technical consequence is that the folding procedure can be directly computed by choosing a base panel on the flat sheet and by traversing the acyclic graph.

As opposed to the acyclic graph, the theoretical case of a local cycle in the panels' adjacency is not handled by the prior art in a satisfactory way. The corresponding significant folding situation is characterized when at least four bend lines are concurrent at a point P and when no boundary line meets point P. It is well known from state of the art that folding is generally impossible with three or less concurrent bend lines. Furthermore, it is well known from state of the art that folding is generally impossible when bend lines in such a cycle are not concurrent and not parallel (parallelism is discussed later).

FIG. 4 illustrates sheet 400 having seven panels including four panels sharing concurrent bend lines (at point P) in a cyclic way. The corresponding adjacency graph 500 shown on FIG. 5 includes the cycle of arcs (1,2), (2,3), (3,4) and (4,1) caused by four concurrent bend lines. Clearly, panels adjacent to concurrent bend lines cannot be folded independently. For example, choose panel 1 as the fixed panel and rotate panel 4 upward around the bend line shared with panel 1. This causes panels 2 and 3 to move accordingly. The final position illustrated in FIG. 6 is such that panels 1 and 2 are in the same plane. Panels 5, 6 and 7 are folded independently. It must be understood that the cyclic situation and the folding conditions are not altered if carton board sheet 400 is punched by a hole in the neighborhood of point P, meaning that there is no material around point P. In particular, the panels' adjacency graph is unchanged. FIGS. 7-8 illustrate this situation with hole 700 around point P on sheet 750, which is otherwise the same as sheet 400 of FIG. 4.

As mentioned previously, a cyclic situation with folding is allowed by parallel bend lines, as illustrated by FIGS. 9-11 which respectively show the sheet when unfolded, the panel's adjacency graph, and the sheet after folding. The folding is made possible because the distance separating bend lines of panel 2 is equal to the distance separating bend lines of panel 4. This situation is out of the scope of the present discussion because it is not difficult to compute.

In this context, the invention aims at improving the design of a folded sheet object.

SUMMARY OF THE INVENTION

According to one aspect, it is therefore provided a computer-implemented method for designing a folded sheet object. The method comprises the step of providing panels separated by bend lines, including at least four adjacent panels forming a cycle and separated by concurrent bend lines, with predetermined angles between successive bend lines. And the method also comprises the step of determining a control law linking the angles between the adjacent panels of the cycle, as a function of the predetermined angles between successive bend lines The method may comprise one or more of the following:
the control law fixes, given predetermined values for a number of the angles between pairs of the adjacent panels equal to the degree of freedom of the cycle, values for the angles between other pairs of the adjacent panels;
when the cycle has four adjacent panels, the control law comprises the solution of an equation of the type $F(\psi, \phi)=0$, where $\psi$ and $\phi$ are the angles between successive pairs of the adjacent panels and $\phi$ is predetermined, the angles between the two other pairs of adjacent panels of the cycle stemming from said solution;
the equation is $$F(\psi,\phi)=k_1-k_2\cos\psi+k_3\cos\psi\cos\phi+k_4\cos\phi-\sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1\ldots 4)}$ are the predetermined angles ($\alpha_i$) between successive bend lines, where $\psi$ is the angle between the pair of the adjacent panels corresponding to $\alpha_1$ and $\alpha_2$, and $\phi$ is the angle between the pair of the adjacent panels corresponding to $\alpha_1$ and $\alpha_3$;
when the cycle has more than four panels, determining the control law comprises partitioning the panels into four groups, and for each group which comprises at least two panels, determining a virtual panel that forms a cycle with the panels of the group, thereby forming a virtual cycle of four adjacent panels that each correspond to a respective group, and the control law comprises the solution of equation F defined for the virtual cycle; and/or
when the cycle has more than four panels and a degree of freedom higher or equal to 2, at least one angle between a pair of adjacent panels is controlled by a variation law depending on the angle between another pair of adjacent panels.

It is further proposed a folded sheet object obtainable by the above method.

It is further proposed a data file storing said folded object.

It is further proposed a computer-implemented method for simulating the folding of a folded sheet object. The method comprises the step of providing predetermined values for a number of the angles between pairs of the adjacent panels. The method also comprises the step of determining values of the other angles between pairs of the adjacent panels with the control law.

It is further proposed a computer program comprising instructions for performing any or both of the above methods. The computer program is adapted to be recorded on a computer readable storage medium.

It is further proposed a computer readable storage medium having recorded thereon the above computer program.

It is further proposed a CAD system comprising a processor coupled to a memory and a graphical user interface, the memory having recorded thereon the above computer program.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where:
FIGS. 1-11 illustrate the context of the methods;
FIG. 12 shows a flowchart of an example of the design method;
FIGS. 16-48 illustrate examples of the methods.

DETAILED DESCRIPTION OF THE INVENTION

Figure 13:
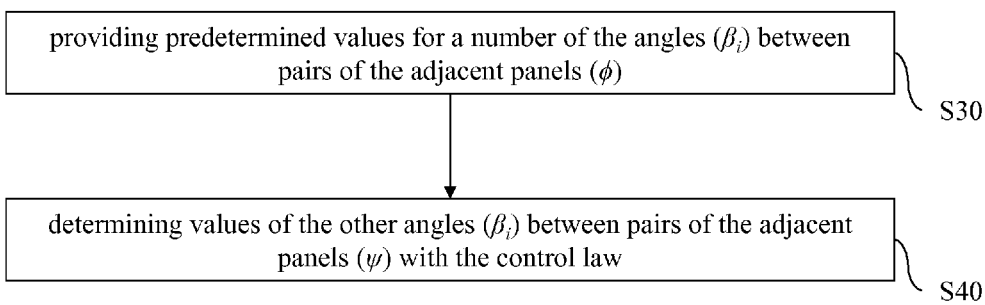
FIG. 13 shows a flowchart of an example of the simulation method.

A description of example embodiments of the invention follows.

FIG. 12 shows a flowchart of an example of computer-implemented method for designing a folded sheet object. The design method comprises providing S10 panels separated by bend lines, including at least four adjacent panels forming a cycle and separated by concurrent bend lines, with predetermined angles between successive bend lines. And the design method also comprises determining S20 a control law linking the angles between the adjacent panels of the cycle, as a function of the predetermined angles between successive bend lines. Such a method improves the design of a folded sheet object.

The design method considers the case mentioned earlier of at least four adjacent panels forming a cycle separated by concurrent bend lines. The design method then determines at S20 a control law that allows the potential simulation of the folding of a folded sheet, since the control law links the angles between the adjacent panels of the cycle. The control law is a function of the predetermined angles between successive bend lines, such that the control law may be determined once and for all after the providing S10. Thus the user need not intervene for the simulation. For this reason, the design method improves the design of a folded sheet object, by considering a specific case (i.e. at least four adjacent panels forming a cycle and separated by concurrent bend lines) that may occur in some industrial cases (e.g. the packaging industry) and adding to the folded sheet object some data (i.e. the control law) that may conveniently be used for simulation of the folding of the folded sheet object, without the need for user intervention.

State of the art packaging design CAD systems cannot handle cyclic situations featuring concurrent bend lines. The background art limitation is the acyclic adjacency graph, which is unable to handle complex cyclic folding. However, complex cyclic folding is useful in packaging design because it helps several panels to be folded at the same time: folding one panel involves neighboring panels folding because of the cyclic dependency. Conversely, an acyclic procedure requires each panel to be folded individually. Folding several panels at the same time through cyclic dependency simplifies the physical folding machine, which in turn shortens the time to design, build and repair the folding machine and, finally, shortens the time to manufacture packaged goods. Some prior art packaging design systems tolerate a cyclic adjacency graph when dealing with the flat sheet design. But, when creating the folding procedure (in simulation), the user is asked to break the cycle by selecting a bend line. This action is not legitimate design intent. It is motivated by the weakness of such prior packaging design system. The resulting folding simulation is unrealistic and time consuming since the user is asked again to manage by hand the behavior of folded panels in the neighborhood of the cut bend line.

On the contrary, the simulation of the folding of a folded sheet object designed by the present design method may be automatic, excluding any user action, or any action that consists in breaking the cycle of adjacent panels (other actions may be performed by the user, e.g. to define the folding configuration, or to define physical constraints/variation laws when there are more than four panels, as explained later).

A folded sheet object is a specific kind of modeled object. A modeled object is any object defined/described by structured data that may be stored in a data file (i.e. a piece of computer data having a specific format) and/or on a memory of a computer system. A folded sheet object is a modeled object that represents any type of physical sheet that may be folded. For example, the folded sheet object designed may represent a planar sheet (the folded sheet object may thus have a "planar state") that may form any kind of package after folding. By extension, the expression "folded sheet object" may designate the data itself, or the physical sheet. Notably, a folded sheet object may comprise data allowing the simulation of the folding of the folded sheet object (thereby representing the folding of the physical sheet represented by the folded sheet object). The folded sheet object obtained by the method has a specific structure. The data forming the folded sheet object designed by the method comprise any data that describe at least four adjacent panels forming a cycle, bend lines separating the panels, predetermined angles between successive bend lines, and eventually the control law.

The design method is for designing a folded sheet object, e.g. the steps of the design method constituting at least some steps of such design. "Designing a folded sheet object" designates any action or series of actions which is at least part of a process of elaborating a folded sheet object. Thus, the design method may comprise creating the folded sheet from scratch, before the providing S10. Alternatively, the design method may comprise providing a folded sheet object previously created, and then modifying the folded sheet object, e.g. for adding to it the control law determined at S20.

The simulation of the folding of such a folded sheet object is easy, as illustrated with reference to FIG. 13. Simulating the folding of a folded sheet object is any action that is, at least part of, describing and/or representing a physical folding of the physical sheet represented by the folded sheet object. The simulation of FIG. 13 comprises a step of providing S30 predetermined values for a number N of the angles between pairs of the adjacent panels. In other words, the simulation of the folding starts with specific objective values for some of the angles between adjacent panels (i.e. angles between two planes intersecting on the bend line separating the adjacent panels, e.g. taken on the side of the planes occupied by the panels), such that the simulation may then comprise a step of determining S40 values of the other angles between pairs of the adjacent panels, such values being compliant with the control law. The determining S40 is done easily with the control law, since the control laws allows, by definition, the deduction of at least one value, for each of the remaining angles, from the angles for which values were given, with a degree of freedom in the determining S40 that depends on N and the total number of panels, and/or potential constraints provided for the angles between adjacent panels. This is explained later.

The determining S40 may be automated. The values provided at the providing step S30 may be provided by the user, or by an underlying process that defines constraints on some of the panels (e.g. to simulate a physical pressure in order to perform the folding of the physical sheet represented by the folded sheet object), in which latter case the providing S30 and the determining S40 may be iterated to simulate the whole folding process of the folded sheet object, e.g. with predetermined time steps. Such a simulation may be subsequent to the design of the modeled object, and/or it may be performed at a separate time, based on the folded sheet object designed by the design method.

The folded sheet object may be a CAD modeled object or a part of a CAD modeled object. In any case, the folded sheet object designed by the method may represent the CAD modeled object or at least part of it, e.g. a 3D space occupied by the CAD modeled object. A CAD modeled object is any object defined by data stored in a memory of a CAD system. According to the type of the system, the modeled objects may be defined by different kinds of data. A CAD system is any system suitable at least for designing a modeled object on the basis of a graphical representation of the modeled object, such as CATIA. Thus, the data defining a CAD modeled object comprise data allowing the representation of the modeled object (e.g. geometric data, for example including relative positions in space).

The design and/or simulation method may be included in a manufacturing process, which may comprise, after performing the method, producing a physical product corresponding to the folded sheet object, e.g. performing a packaging method with a physical sheet represented by the folded sheet object, e.g. the folding in the packaging method being performed according to the simulation method. In any case, the folded sheet object designed by the method may represent a manufacturing object, e.g. a physical sheet such as a board sheet in any foldable material, e.g. carton/paper/plastic/metal. The method can be implemented using a CAM system, such as DELMIA. A CAM system is any system suitable at least for defining, simulating and controlling manufacturing processes and operations.

The methods are computer-implemented. This means that the methods are executed on at least one computer, or any system alike. For example, the methods may be implemented on a CAD system. Thus, steps of the methods are performed by the computer, possibly fully automatically, or, semi-automatically (e.g. steps which are triggered by the user and/or steps which involve user-interaction, for example for validating results).

A typical example of computer-implementation of the design and/or simulation method is to perform the method with a system suitable for this purpose. The system may comprise a memory having recorded thereon instructions for performing the method. In other words, software is already ready on the memory for immediate use. The system is thus suitable for performing the method without installing any other software. Such a system may also comprise at least one processor coupled with the memory for executing the instructions. In other words, the system comprises instructions coded on a memory coupled to the processor, the instructions providing means for performing the method. Such a system is an efficient tool for designing a folded sheet object.

Such a system may be a CAD system. The system may also be a CAE and/or CAM system, and the CAD modeled object may also be a CAE modeled object and/or a CAM modeled object. Indeed, CAD, CAE and CAM systems are not exclusive one of the other, as a modeled object may be defined by data corresponding to any combination of these systems.

The system may comprise at least one GUI for launching execution of the instructions, for example by the user. Notably, the GUI may allow the user to trigger the step of providing S10 or S30, and then, if the user decides to do so, e.g. by launching a specific function, to trigger the rest of the method.

The folded sheet object may be 3D (i.e. three-dimensional). This means that the folded sheet object is defined by data allowing its 3D representation. A 3D representation allows the viewing of the representation from all angles. For example, the folded sheet object, when 3D represented, for example during simulation of the folding, may be handled and turned around any of its axes, or around any axis in the screen on which the representation is displayed. This notably excludes 2D icons, which are not 3D modeled, even when they represent something in a 2D perspective. The display of a 3D representation facilitates design or understanding of a simulation (i.e. increases the speed at which designers or engineers statistically accomplish their task). This speeds up the manufacturing process in the industry.

Figure 14:
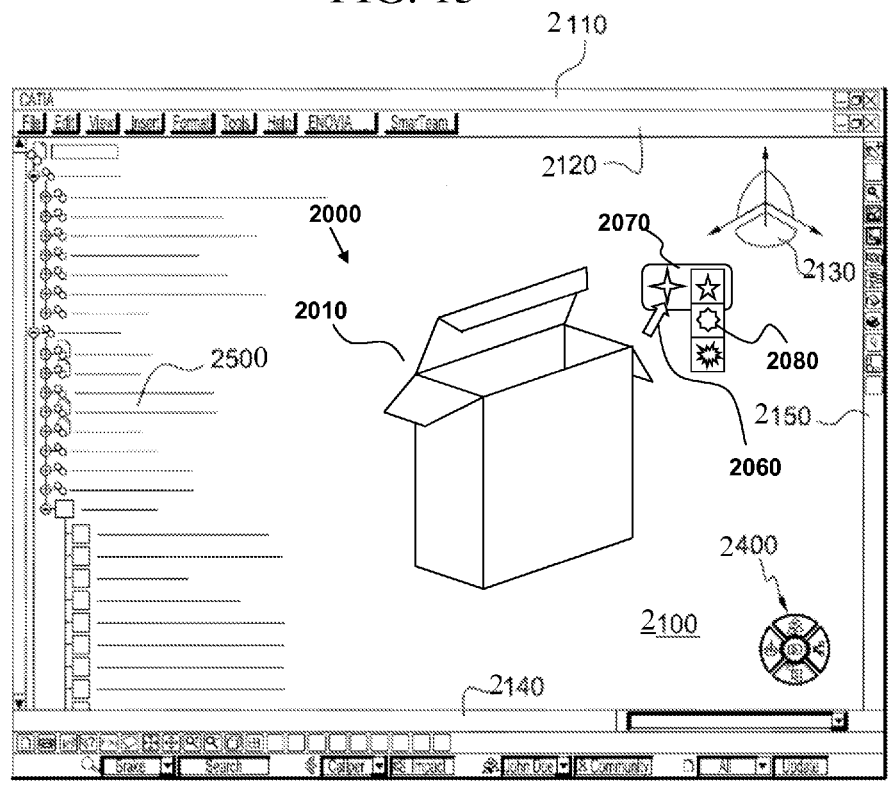
FIG. 14 shows an example of a graphical user interface.

FIG. 14 shows an example of the GUI of a typical CAD system, which may include functionality for performing the design or the simulation. Standard functionalities of such a system are now discussed.

The GUI may be a typical CAD-like interface, having standard menu bars 2110, 2120, as well as bottom and side toolbars 2140, 2150. Such menu and toolbars contain a set of user-selectable icons, each icon being associated with one or more operations or functions, as known in the art. Some of these icons are associated with software tools, adapted for editing and/or working on the 3D modeled object 2000 (folded sheet object) displayed in the GUI. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. a sculpting operation, or any other operation such as a change of dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 14, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or rendering various attributes of the displayed product 2000. A cursor 2060 may be controlled by a haptic device to allow the user to interact with the graphic tools.

Figure 15:
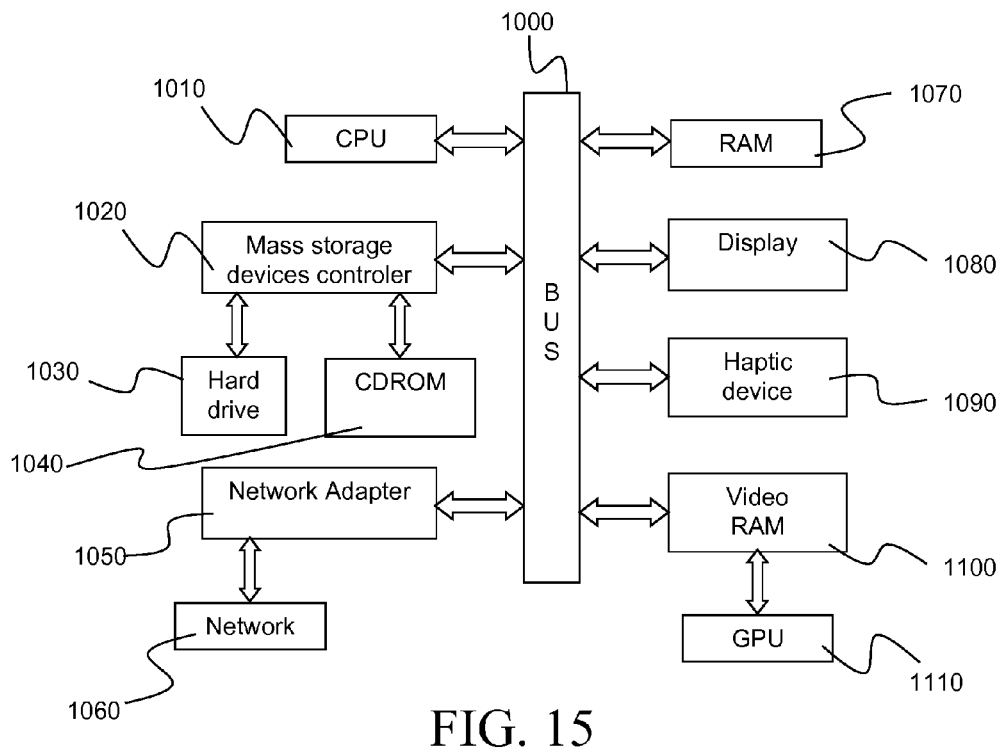
FIG. 15 shows an example of a client computer system.

FIG. 15 shows an example of the architecture of the system as a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphics processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks, magneto-optical disks, and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as a cursor control device, a keyboard or the like. A cursor control device is used in the client computer to permit the user to selectively position a cursor at any desired location on screen 1080. By screen, it is meant any support on which displaying may be performed, such as a computer monitor. In addition, the cursor control device allows the user to select various commands, and input control signals. The cursor control device includes a number of signal generation devices for input control signals to system. Typically, a cursor control device may be a mouse, the button of the mouse being used to generate the signals.

To cause the system to perform the method, it is provided a computer program comprising instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing CAD system to a state wherein the system is suitable for performing the method.

The design method is now further discussed.

As explained earlier, the folded sheet object is provided at S10 as data describing panels (representing physical panels, e.g. planar) separated by bend lines (representing bend lines between two physical panels, e.g. straight). Each bend line may be associated to two panels separated by said bend line. Such data may be provided at S10 as geometry and topology. The data may comprise or not comprise information regarding the thickness of the panels of the folded sheet object. In an example, the method is performed as if the physical sheet is made of a zero thickness material. The panels may have any form. The panels may be quadrilateral, e.g. rectangular as on FIG. 4 or trapezoid as on FIG. 1, as such panels are the most practical ones in the packaging industry. The folded sheet object may or may not comprise holes, as on FIG. 7.

Now, the folded sheet object provided at S10 is of a specific kind, as it includes at least four adjacent panels forming a cycle and separated by concurrent bend lines, as sheet 400 of FIG. 4 or sheet 750 of FIG. 7. In other words, the folded sheet object provided at S10 includes a set of panels (with a number equal or higher to 4) that are two-by-two adjacent and form a cycle. A cycle designates the fact that browsing the panels of the cycle from one panel to an adjacent one, starting from an initial panel of the cycle, eventually brings back to the initial panel. For example, an adjacency graph may be provided at S10 or computed afterwards. Such a graph may have nodes associated to panels and arcs each associated to the bend line separating the two adjacent panels associated to the nodes connected by the respective arc, as graph 500 of FIG. 5. A cycle of the graph corresponds to a contemplated cycle of the method. Moreover, the bend lines involved in said cycle are concurrent (i.e. they all intersect at a same point, e.g. considering their infinite support lines). The data defining the folded sheet object further contains predetermined angles $\alpha_i$ between successive bend lines. In other words, given two "successive" bend lines (i.e. consecutive on the adjacency graph), thus associated to a same panel i (and separating said panel from a different other panel on each side of the panel), the angle $\alpha_i$ between the bend lines (e.g. on the side of the panel associated to the bend lines) is known. Said angle is predetermined and fixed, thereby modeling rigidity of the panels.

Now, given such information on the folded sheet object, the method determines at S20 a control law linking the angles $\beta_i$ between the adjacent panels of the cycle, as a function of the predetermined angles $\alpha_i$. The angles $\beta_i$ are the angles between two adjacent panels (i.e. angles between two planes intersecting on the bend line separating the adjacent panels, e.g. taken on the side of the planes occupied by the panels). At any time, the folded sheet object may be described, in terms of its position e.g. during folding, by the angles between all pairs of adjacent panels. The method is discussed for the case of one contemplated cycle. But as many control laws as there are cycles (which may generally be one or more) may be determined by the method, and control laws linking other angles, i.e. not belonging to cycles, may also be determined by the method. The way several such control laws are organized and the way to simulate the folding of the whole folded sheet object is however out of the scope of the present discussion, as it may be an implementation detail. The control law determined at S20 is any kind of data that tells how the angles $\beta_i$ (of the contemplated cycle) relate all together. The control law thus corresponds to physical folding possibilities offered for a physical sheet corresponding to the folding sheet object. The control law is provided as a function of the angles $\alpha_i$ such that the simulation of the folding necessarily corresponds to what is physically possible.

For example, the control law may fix, given predetermined values for a number of the angles $\beta_i$ between pairs of the adjacent panels equal to the degree of freedom of the cycle, values for the angles $\beta_i$ between other pairs of the adjacent panels. This allows a fast and easy simulation.

Indeed, a cycle may have a degree of freedom, depending on the number of panels the cycle comprises and on the predetermined angles $\alpha_i$ between successive bend lines. A bend line is said to be folded when the angle between its two adjacent panels changes. The degree of freedom is the highest number of bend lines (of the cycle) that may be folded separately, in the theoretical case that no constraint exists on the panels except for the fact they are rigid and attached by the bend lines in a rotary way. For example, a cycle of four panels such as cycles comprising panels 1, 2, 3 and 4 of sheet 400 of FIG. 4 or sheet 750 of FIG. 7 has a degree of freedom equal to 1, as performing a folding for any pair of the adjacent panels physically leads the other panels of the cycle to move accordingly in order to accompany the folding (the four panels thereby forming one group). Now, if values for a number N of the angles $\beta_i$ are provided, with N equal to such a degree of freedom, it physically means that the other angles $\beta_i$ have to take corresponding values (these values are fixed by the fact that the panels are rigid and are attached by the bend lines). The control law may solve that, by "fixing" such values (i.e. outputting the "fixed" values stemming from the physical configuration of a real sheet represented by the folded sheet object). Referring back to FIG. 13, the simulation method may then simply provide at S30 a number of values equal to the degree of freedom, such that the determining S40 may directly be performed with the control law. The case where fewer values of angles $\beta_i$ than the degree of freedom are provided is detailed later. Simply put, the simulation may set values for other angles $\beta_i$ in any way so that the total number of values reaches the degree of freedom, and the simulation may then directly use the control law of the example.

As exemplified later, the folding may comprise several (discrete) configurations. A folding configuration is a way of completing the folding of the physical sheet, in the theoretical case that no constraint exists on the panels except for the fact they are rigid and attached by the bend lines in a rotary way. Actually, as known from the packaging industry, a same folded sheet object may be folded in different ways, depending, for a given degree of freedom, on the geometry of the cycle, including the values of predetermined angles $\alpha_i$ between successive bend lines. This variety of folding ways leads to different results at the end of the physical folding (until panels stick together and physically block the folding). These different discrete results correspond to so-called folding configurations. Starting from a planar state, for example, given folded sheet object 400 of FIG. 4, the folding may result in the configuration represented on FIG. 16, but it could also result in another configuration, represented on FIG. 22, as discussed later. This is because different strategies may be followed to fold the cycle at point P.

As will be exemplified later, the control law may fix, given predetermined values for a number of the angles $\beta_i$ between pairs of the adjacent panels equal to the degree of freedom of the cycle, a value for each angle $\beta_i$ between other pairs of the adjacent panels, for any, several or each respective folding configuration. In other words, the control law may be adapted to the fact that there may be several folding configurations, and the control law may output angles for the angles $\beta_i$ according to any requirements regarding the configurations that may be simulated. This allows any wanted simulation to be feasible.

Referring back to the simulation of the folding of FIG. 13, the simulation may simulate any, several or all the folding configurations, that are allowed by the values provided at S30. Alternatively, the user may select one or more configurations to simulate, for example by indicating virtual pressures to perform on at least one of the panels. Such virtual pressures may correspond to physical pressures applied by a folding machine on the physical sheet represented by the folded sheet object, during a packaging process.

For example, the folded sheet object may be initially provided as a planar sheet, e.g. having one or more cycles as defined above. Then the user may activate a folding simulation function of the system. Then the user may be asked to apply virtual pressures on panels of the cycles(s), thereby, for each cycle, defining initial values for a number N of the angles ($\beta_i$) between pairs of the adjacent panels ($\phi$), with N inferior or equal to the degree of freedom of the cycle (N=1 in the case of a cycle of four panels). For example a value corresponding to a predetermined angular delta (e.g. equal to 1°) is set for each angle $\beta_i$ between two adjacent panels for which a pressure is applied to one of the panels (so-called "initial angle"). For example, one of the two panels may be fixed, and the other one, to which a pressure is applied, rotated related to the fixed panel. Alternatively, such values may be defined automatically, in any possible way. In any case, said initial values are provided at S30, and may already define one folding configuration in this example. The simulation method may then, at the determining S40, determine the values for the other angles $\beta_i$, as explained earlier. Steps S30 and S40 may be repeated, each time adding the predetermined angular delta to each initial angle. The addition of the predetermined angular delta is stopped once two adjacent panels are folded such that one lies on the other. The folded sheet object may be represented, e.g. displayed, throughout such iteration, so that the whole folding procedure may be represented.

As can be seen, the goal of the presented methods is to solve complex cyclic folding with a control law, e.g. by using a closed form formula as discussed later. Thanks to the control law, the folding of the folded sheet object may be easily simulated as explained earlier, by giving a value for some of the angles $\beta_i$ at S30, and deducing at S40 the values of the other angles $\beta_i$ thanks to the control law, possibly automatically.

As mentioned above, for the simulation, the user may be asked to provide authentic design information to the system, at the beginning of the providing S30, e.g.:
choose the initial folding orientation; and/or
if there are more than four bend lines, choose the controlled bend line(s) and define the angle(s) variation(s).

An example where folded sheet 400 of FIG. 4 is provided at S10 is now discussed to illustrate the case of four concurrent bend lines and as many adjacent panels.

Figure 16:
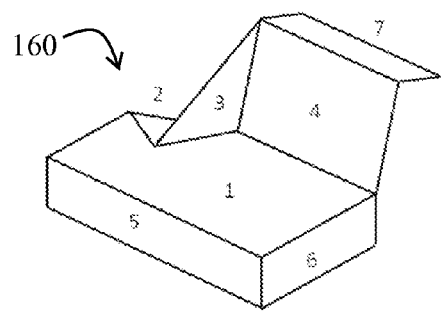
Figure 17:
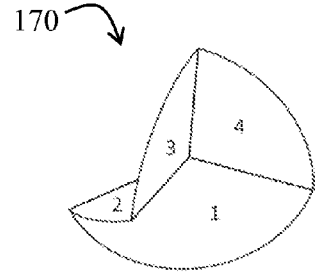

FIG. 16 illustrates the three-dimensional shape 160 of folded sheet object 400 of FIG. 4, used hereafter to illustrate the design method for the cycle around point P (including panels 1, 2, 3 and 4). FIG. 17 illustrates local shape 170 of panels 1, 2, 3 and 4 involved in the cycle in an intermediary position where panel 2 is not yet onto panel 1, like in FIG. 16.

The method of the example solves the problem of simulating a complex cyclic folding. The solution is to evaluate a mathematical function given by the closed form formula.

In other words, no numerical or iterative algorithm is needed, which makes the method simple, fast, and CPU-efficient. Furthermore, as discussed later the method may advantageously reuse the singularity analysis of the closed form formula. This is particularly efficient in packaging design because the planar starting situation is in fact a singular situation from the equations point of view.

The closed form formula implemented by the control law is now discussed for a 4-cycle such as the one of the example of FIG. 17.

Figure 18:
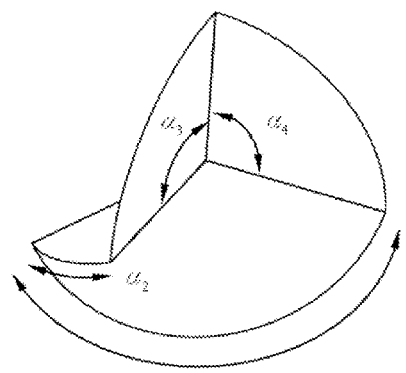

The geometry of the 4-cycle may be entirely specified by setting angles $\alpha_i$, i=1, ..., 4 between consecutive bend lines that are provided at S10. FIG. 18 shows angles $\alpha_i$.

In this example, the cycle has four adjacent panels and the control law comprises the solution of an equation of the type $F(\psi,\phi)=0$. In other words, the control law describes a process that outputs, given predetermined values for a one of the angles $\beta_i$ between pairs of the adjacent panels, referred to as q), the degree of freedom of the cycle being equal to 1, values for the angles $\beta_i$ between other pairs of the adjacent panels, including $\psi$, said process comprising solving (i.e. outputting the solution of) $F(\psi,\phi)=0$ so as to first determine $\psi$, and then other angles $\beta_i$ in a straightforward way. Angles $\psi$ and $\phi$ are the angles between successive pairs of the adjacent panels. In other words, given a predetermined order between panels (e.g. clockwise or anti-clockwise, given any normal), two successive pairs of adjacent panels are likewise ordered, by the fact that they share a common panel (as they are successive). Referring to FIG. 17, with a normal vector pointing in the direction of the reader and a clockwise order, pair of adjacent panels {2,3} succeeds to pair of adjacent panels {1,2}. In the formula, $\phi$ is predetermined. Solving the formula thus provides $\psi$, and eventually the other angles $\beta_i$ of the cycle. It is said that these two other angles "stem" from said solution for this reason, as they are a directly computed from $\psi$ and $\phi$, since the degree of freedom of the cycle is 1. It is noted that the chosen starting angles for the solution are a matter of naming convention. The order between $\psi$ and $\phi$ is also a matter of convention of the order around point P.

Figure 19:
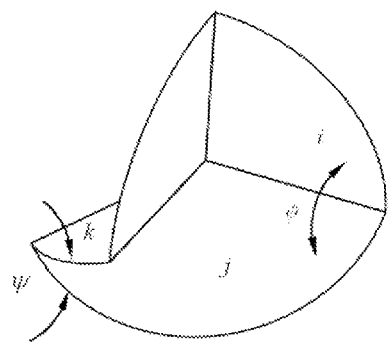

To sum up, given three consecutive panels i, j, k, let angle $\phi$ be the angle between panels i and j and let angle $\psi$ be the angle between panels j and k, as illustrated on FIG. 19. In a first step, the basic formula for a 4-cycle is an implicit relationship $F(\psi,\phi)=0$. This allows a simple solution and thus a simple and fast simulation.

The equation (function F) may specifically be:

$$F(\psi, \phi) = k_1 - k_2\cos\psi + k_3\cos\psi\cos\phi + k_4\cos\phi - \sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1,\ldots,4)}$ are the predetermined angles between successive bend lines, where $\psi$ is the angle between the pair of the adjacent panels corresponding to $\alpha_1$ and $\alpha_2$, and $\phi$ is the angle between the pair of the adjacent panels corresponding to $\alpha_1$ and $\alpha_3$.

Solving $F(\psi, \phi)=0$ with respect to angle $\psi$ yields two closed form expressions of angle $\psi$ with respect to angles $\phi$ and $\alpha_i$, each corresponding to a different folding configuration:

$$\psi^+ = \alpha + \cos^{-1}\left(\frac{c}{\sqrt{a^2+b^2}}\right)$$

$$\psi^- = \alpha - \cos^{-1}\left(\frac{c}{\sqrt{a^2+b^2}}\right)$$

Where:

$$a = k_2 - k_3 \cos\phi$$

$$b = \sin\phi$$

$$c = -k_1 - k_4 \cos\phi$$

And where angle $\phi$ is defined by:

$$\cos\alpha = \frac{a}{\sqrt{a^2+b^2}}$$

$$\sin\alpha = \frac{b}{\sqrt{a^2+b^2}}$$

In order to capture parameters dependency, $\psi^+$ and $\phi^-$ are considered as functions $\psi^+(\alpha_1, \alpha_2, \alpha_3, \alpha_4, \phi)$ and $\psi^-(\alpha_1, \alpha_2, \alpha_3, \alpha_4, \phi)$. The formulas that define these functions are valid as long as angles $\phi$ and $\alpha_i$ are such that $c^2 \leq a^2+b^2$. If angles $\phi$ and $\alpha_i$ are such that $c^2 > a^2+b^2$, there exists no angle $\psi$ such that $F(\psi,\phi)=0$. In such a case, the method may output that the simulation is not feasible. If angles $\phi$ and $\alpha_i$ are such that $c^2 = a^2+b^2$, then $$\frac{c}{\sqrt{a^2+b^2}} = \pm 1$$

and $\psi^+ = \psi^- = \alpha$.

An example of the initial situation when solving the four bend lines complex folding is now discussed.

In the context of packaging design, the starting situation is a flat carton board sheet, meaning that for the folded sheet object:

$$\alpha_1 + \alpha_2 + \alpha_3 + \alpha_4 = 2\pi$$

$$\psi_0 = \pi$$

$$\phi_0 = \pi$$

Figure 20:
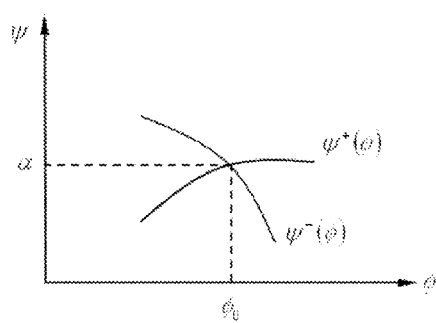

Then, $b=0$ and $c^2=a^2$, which makes $\psi_0=\pi$ a double solution. This means that when starting to fold, that is, when changing the value of angle $\phi_0=\pi$ into a smaller value $\phi<\pi$, the two motions $\phi \mapsto \psi^+(\alpha_1, \alpha_2, \alpha_3, \alpha_4, \phi)$ and $\phi \mapsto \psi^-(\alpha_1, \alpha_2, \alpha_3, \alpha_4, \phi)$ are possible, corresponding to a respective folding configuration. Consequently, the designer may choose one solution by orienting the folding of one bend line, for example by defining a virtual pressure on a panel adjacent to another panel defined (again by the user) to be fixed. It must be understood that, in the simulation of one folding configuration, after the folding started according to the user's choice, the solution is locally unique and the motion is well defined, as illustrated on FIG. 20.

Figure 21:
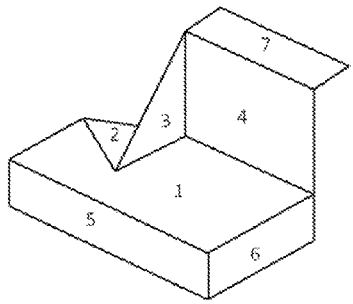
Figure 22:
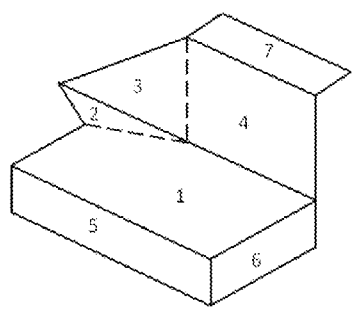

FIGS. 21-22 illustrate this choice. FIG. 22 is the alternate folding where panels 1 and 2 remain coplanar as well as panels 3 and 4. The singularity analysis of the planar initial configuration states that if one $\alpha_i$ angle is larger than $\pi$, then the said configuration is isolated, meaning that the folding is impossible.

Figure 23:
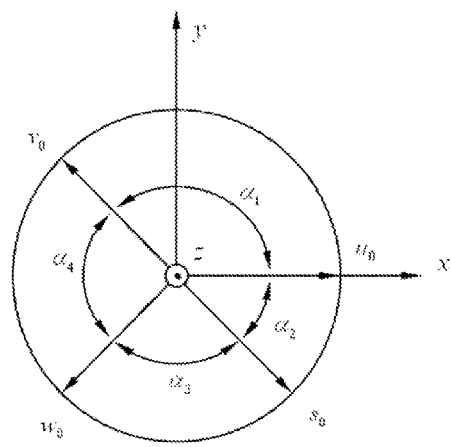

Panels positions may be computed by associating the following xyz axis system to the 4-cycle. The origin of the axis system is the concurrent point of bend lines and the first vector of the axis system is the bend line $u_0$ shared by panels 1 and 2. Bend line $v_0$ is shared by panels 1 and 4. Bend line $w_0$, is shared by panels 3 and 4. Bend line $s_0$ is shared by panels 2 and 3. Axis system, bend lines vectors and panels are illustrated on FIG. 23.

At initial flat position, and considering that $\Sigma_i \alpha_i = 2\pi$, the coordinates of vectors $u_0$, $v_0$, $w_0$, and $s_0$ are the following.

$$u_0 = \begin{pmatrix} 1 \\ 0 \\ 0 \end{pmatrix}$$

$$v_0 = \begin{pmatrix} \cos\alpha_1 \\ \sin\alpha_1 \\ 0 \end{pmatrix}$$

$$w_0 = \begin{pmatrix} \cos(\alpha_1 + \alpha_4) \\ \sin(\alpha_1 + \alpha_4) \\ 0 \end{pmatrix}$$

$$s_0 = \begin{pmatrix} \cos(\alpha_1 + \alpha_4 + \alpha_3) \\ \sin(\alpha_1 + \alpha_4 + \alpha_3) \\ 0 \end{pmatrix}$$

During the motion, panel number 1 is fixed, meaning that $u_0$ and $v_0$, do not depend on angle $\phi$. Notation $R(\theta, u)$ is the rotation defined by angle $\theta$ and axis $u$. Then, as the angle $\phi$ changes from the initial value $\phi=\pi$ to a final value $\phi=\phi_1$, the corresponding motion of bend line $w_0$ is:

$$w(\phi) = R(\pi-\phi, v_0) w_0$$

meaning that bend line $w_0$ is rotated with angle it $\pi-\phi$ around axis $v_0$. Similarly, the corresponding motion of bend line $s_0$ is:

$$s(\phi) = R(\psi^\epsilon(\phi) + \pi, u_0) s_0$$

meaning that bend line $s_0$ is rotated with angle $\psi^\epsilon(\phi)+\pi$ around axis $u_0$. Symbol $\epsilon$ is + or − depending on the user's initial choice.

It should be noticed that the angle between vector $w(\phi)$ and vector $s(\phi)$ is equal to $\alpha_3$ for any value of angle $\phi$. This is because the rigidity of each panel is captured by functions $\psi^+$ and $\psi^-$.

Figure 24:
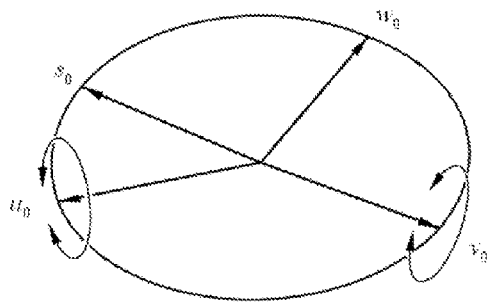
Figure 25:
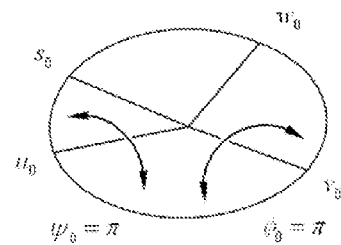
Figure 26:
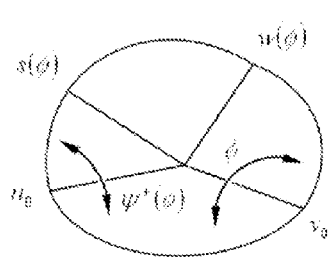
Figure 27:
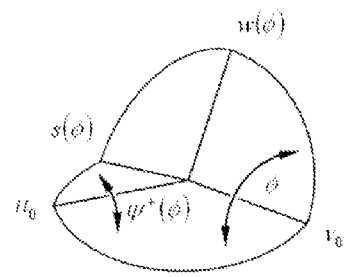
Figure 28:
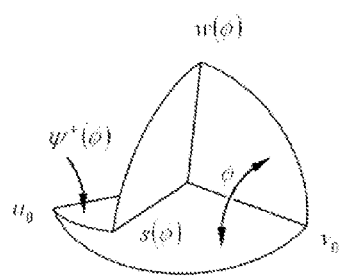
Figure 29:
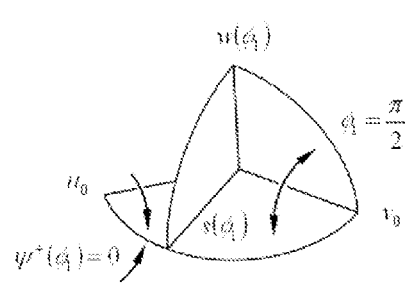

FIG. 24 illustrates the useful rotations in a perspective view of the initial flat situation. By decreasing angle $\phi$ from initial value $\phi_0=\pi$ to a target value $\phi_1$ and by positioning bend lines according to the previous process, positions of all four panels are completely defined for each $\phi \in [\phi_0, \phi_1]$, as illustrated in FIGS. 25-29 which chronologically show the folding for $$\alpha_1 = \frac{3\pi}{4}, \alpha_2 = \frac{\pi}{4}, \alpha_3 = \frac{\pi}{2}, \phi_0 = \pi \text{ and } \phi_1 = \frac{\pi}{2}.$$

The previous process provides exact positioning of all panels. In addition, and for practical reasons, it might be useful to compute angle values between adjacent panels.

Panels are numbered 1, 2, 3, 4 according to their respective bend line angles $\alpha_1$, $\alpha_2$, $\alpha_3$, $\alpha_4$.

Figure 30:
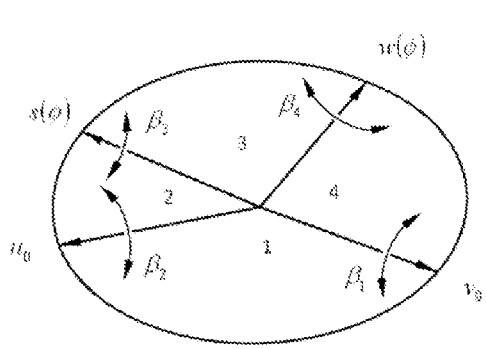

By definition, angle $\beta_1$ is the angle between panels 4 and 1, $\beta_2$ is the angle between panels 1 and 2, $\beta_3$ is the angle between panels 2 and 3, and $\beta_4$ is the angle between panels 3 and 4, as illustrated in FIG. 30. According to previous section, $\beta_1(\phi)=\phi$ is the input angle and $\beta_2(\phi)=\psi^\epsilon(\phi)$. Angles $\beta_3$ and $\beta_4$ are computed as follows.

Firstly, normal vectors of panels 2, 3 and 4 are computed by using their respective bend lines. Bend lines of panel 2 are $u_0$ and $s(\phi)$, so normal vector $n_2$ of panel 2 is the normalized cross product $$n_2 = \frac{s(\phi) \times u_0}{\|s(\phi) \times u_0\|}$$

Bend lines of panel 3 are $w(\phi)$ and $s(\phi)$, so normal vector $n_3$ of panel 3 is the normalized cross product:

$$n_3 = \frac{w(\phi) \times s(\phi)}{\|w(\phi) \times s(\phi)\|}$$

Bend lines of panel 4 are $v_0$ and $w(\phi)$, so normal vector $n_4$ of panel 4 is the normalized cross product:

$$n_4 = \frac{v_0 \times w(\phi)}{\|v_0 \times w(\phi)\|}$$

Secondly, a panel is locally considered as an oriented half plane limited by a bend line. In order to capture which side of the half plane includes the panel, a so-called "side vector" is needed. This side vector is defined by the cross product of the normal vector of the panel with the bend line direction oriented according to the local topology. The naming convention is that $m_{ij}$ is the side vector of bend line measuring $\beta_i$ with respect to panel j. Since each bend line is shared by two panels, there are eight side vectors.

Figure 31:
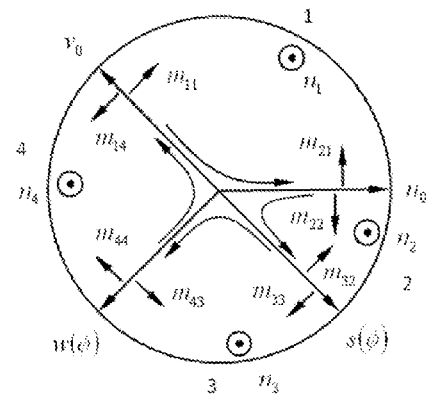

FIG. 31 illustrates all topological orientations on the top view of the initial flat situation. Normal vectors point toward the reader. According to the definition, vectors $m_{ij}$ are computed as follows.

$m_{11}=n_1\times(-v_0)$ $m_{14}=n_4\times v_0$ $m_{21}=n_1\times u_0$ $m_{22}=n_2\times(-u_0)$ $m_{32}=n_2\times s(\phi)$ $m_{33}=n_3\times(-s(\phi))$ $m_{43}=n_3\times w(\phi)$ $m_{44}=n_4\times(-w(\phi))$ Now, cosines of angles $\beta_3$ and $\beta_4$ are the scalar products of adjacent side vectors, that is:

$\cos(\beta_3)=(m_{32},m_{33})$ $\cos(\beta_4)=(m_{43},m_{44})$

Figure 32:
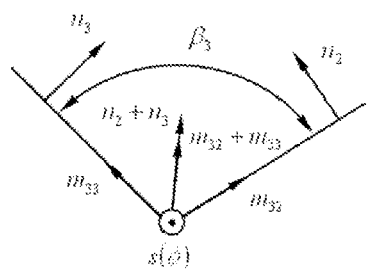
Figure 33:
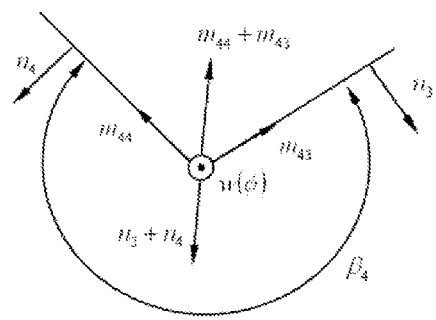
Figure 34:
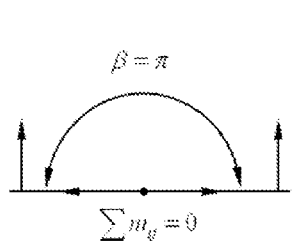
Figure 35:
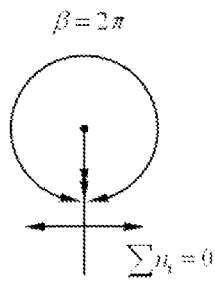
Figure 36:
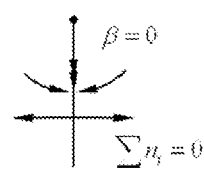

In order to determine the signs of sinus values, the so-called "sector" is introduced. By definition the sector of two adjacent panels is the region of 3D space that includes the normal vectors of both panels. Angles $\beta_i$ precisely define these sectors. In fact the so-called "sectors sharpness's" $\sigma_i$, i=1, . . . , 4 are useful. The sector sharpness is the sign of the scalar product of the sum of side vectors with the sum of normal vectors. The sharpness's of interest are:

$\sigma_3=\text{Sign}(m_{32}+m_{33},n_2+n_3)$ $\sigma_4=\text{Sign}(m_{43}+m_{44},n_3+n_4)$ By construction, if this scalar product is positive (respectively negative), the sector is sharp (resp. non sharp). FIG. 32-33 respectively illustrate a sharp sector for angle $\beta_3$ and a non-sharp sector for angle $\beta_4$. The scalar product vanishes either when the sum $\Sigma n_i$ of normal vectors vanishes or when the sum $\Sigma m_{ij}$ of side vectors vanishes. When the sum of side vectors vanishes, the sector is flat and the angle $\beta$ is equal to $\pi$. When the sum of normal vectors vanishes, the sector is either full and angle $\beta$ is equal to $2\pi$, or the sector is knife-shaped and angle $\beta$ is equal to 0, which is equivalent. FIGS. 34-36 illustrate degenerate sectors. Finally, if the sector of angle $\beta_i$ is sharp, then $\sin(\beta_i)>0$. If the sector of angle $\beta_i$ is non-sharp, then $\sin(\beta_i)<0$. Tables I and II gather all the results for computing respectively angles $\beta_3$ and $\beta_4$, which ends the determination S40 of angles between adjacent panels.

TABLE I computation of angle $\beta_3$

| | | $\beta_3$ |
|---|---|---|
| | $\sigma_3 > 0$ | $\cos^{-1} <m_{32}, m_{33}>$ |
| | $\sigma_3 < 0$ | $2\pi - \cos^{-1} <m_{32}, m_{33}>$ |
| $\sigma_3 = 0$ | $n_2 + n_3 = 0$ | 0 $2\pi$ |
| | $m_{32} + m_{33} = 0$ | $\pi$ |

TABLE II computation of angle $\beta_4$

| | | $\beta_4$ |
|---|---|---|
| | $\sigma_4 > 0$ | $\cos^{-1} <m_{43}, m_{44}>$ |
| | $\sigma_4 < 0$ | $2\pi - \cos^{-1} <m_{43}, m_{44}>$ |
| $\sigma_4 = 0$ | $n_3 + n_4 = 0$ | 0 $2\pi$ |
| | $m_{43} + m_{44} = 0$ | $\pi$ |

Obviously, according to the geometry provided at S10, the control law may thus indicate if an objective of angles $\beta_i$ is possible or not, and determined the remaining angles $\beta_i$ only when it is possible.

The general case when the cycle has more than four panels (four panels or more) is now discussed.

In such a case, the design method may determine at S20 the control law based on the theoretical developments for determining the control law in the case the cycle has four panels. Namely, the determining S20 may comprise partitioning the panels into four groups. In other words, the panels are gathered into groups of at least one panel (depending on the total number of panels of the cycle). Then, for each group which comprises at least two panels, the method may determine a virtual panel that forms a cycle with the panels of the group (i.e. the virtual panel is a theoretical panel that would form a cycle of adjacent panels with the panels of the group), thereby forming a virtual cycle of four adjacent panels (virtual or not virtual) that each correspond to a respective group. In other words, the cycle of more than four panels is assimilated to a cycle of four panels. As a consequence, the determining S20 may easily end by defining equation F defined for the virtual cycle, just like what is performed in the case of four panels (explained above), and the control law determined at S20 may then simply comprise the solution of said equation F.

The relevant point in such a generalization of the four panel case is that the virtual panels are not rigid, unlike the real initial panels of the folded sheet object. Thus, the angles between successive bend lines of the virtual cycle are not necessarily fixed. However, for the purpose of solving F for the virtual cycle, said angles are fixed (thus, the angles between the panels forming a cycle with a virtual panel are set to a determined value at a given time of the simulation of the folding). How to set such angles between the panels is explained later. It is noted that in the implementation of the algorithm, recursion may be used to bring the problem of more than four panels to the problem of four panels, according to the creation of virtual panels discussed here.

The generalization is now discussed with the specific case of a five-panel cycle.

When dealing with a five-panel cycle, the principle is to define an equivalent four-panel cycle and to reuse the previous formulas. This is done by replacing two adjacent panels by an equivalent panel as illustrated in FIGS. 37-39. Which pair of adjacent panels should be replaced by an equivalent panel depends on the overall folding strategy, which may involve the user's choice. It must be understood that the so-called "equivalent panel" or "virtual panel" is an artifact for reusing the closed form expressions of $\psi^+(\cdot)$ and $\psi^-(\cdot)$. It may not have any physical meaning.

FIG. 37 shows the initial five-cycle, where $\alpha_i$, $i=1, \ldots, 5$ are angle between consecutive bend lines. FIG. 38 drawing displays the equivalent panel together with the pair (2,3) of adjacent panels to be replaced. Angle δ is the angle between bend lines of the equivalent panel. FIG. 39 shows the equivalent four-cycle.

In order to reuse the four-cycle formula, it is necessary to compute the angle of the equivalent panel according to those of the replaced panels. FIGS. 40-41 illustrate adjacent panels ABC and ADC sharing bend line AC and the equivalent panel ABD. Let $\gamma=\widehat{BAC}$ and $\beta=\widehat{CAD}$ be the respective angles between the bend lines of the two adjacent panels and let θ be the angle between their respective planes, as illustrated in FIGS. 42-43.

Then, the angle $\delta=\widehat{BAD}$ of the equivalent panel is given by the following formula:

$$\delta(\beta,\gamma,\theta)=\cos^{-1}(\cos\beta\,\cos\gamma+\sin\beta\,\sin\gamma\,\cos\theta)$$

Now, when the cycle has more than four panels and a degree of freedom higher or equal to 2 (which is the case of the example now discussed), at least one angle between a pair of adjacent panels may be controlled by a variation law depending on the angle between another pair of adjacent panels. A variation law is thus a function that links two angles $\beta_i$ together, by putting the value of one under the control of the value of the other. Such a variation law may simplify the task of the user when simulating the folding in a case of more than four panels. The variation law may be deduced from physical or machining constraints of the folding.

Figure 44:
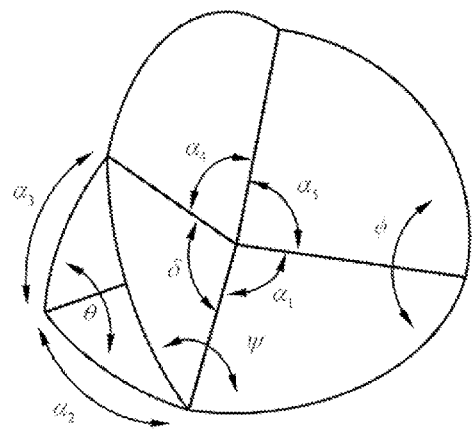

In the example, during the folding motion, angle θ is controlled by a variation law depending on the driving angle φ. This variation law depends on the folding strategy and may involve the user's decision. This means that angle δ between the two bending lines of the replacing panel is allowed to change during the motion. Collecting all data in the same drawing yields to FIG. 44.

By choosing φ as the driving angle and by noting the variation law $\theta=\theta(\phi)$, the angle $\delta=\delta(\alpha_2,\alpha_3,\theta(\phi))$ is related to according to the previous formula. Finally, angle ψ is given by the following formula, where $\epsilon\in\{+,-\}$ depends on the initial choice, $$\psi=\psi^\epsilon(\alpha_1,\delta(\alpha_2,\alpha_3,\theta(\phi)),\alpha_4,\alpha_5,\phi)$$

Generalization to an arbitrary number of bend lines is possible by successively combining pairs of adjacent panels until the resulting number of panels is four.

Figure 45:
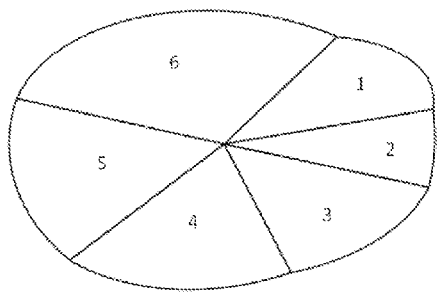
Figure 46:
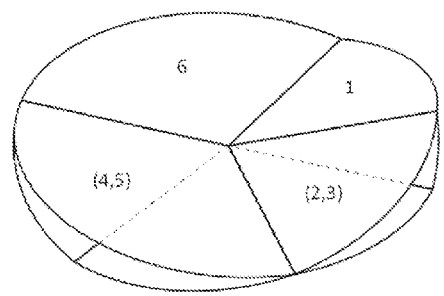

For example, given a 6-cycle $\alpha_1, \ldots, \alpha_6$, suppose that angle φ controls the angle between adjacent panels 1 and 6. Let (1,2,3,4,5,6) be the notation for the sequence of adjacent panels. According to the user's defined folding strategy, panels 2 and 3 are replaced by an equivalent panel, noted (2,3). This requires a variation law $\theta_1=\theta_1(\phi)$ for controlling the angle between panels 2 and 3 and this introduces angle $\delta_1(\alpha_2, \alpha_3, \theta_1(\phi))$ between the bend lines of the equivalent panel (2,3). This reduces the number of adjacent panels from six to five, and the new sequence is noted (1, (2,3), 4,5,6). Then, following the user defined folding strategy, adjacent panels 4 and 5 are replaced by an equivalent panel, noted (4,5), thus requiring another variation law $\theta_2=\theta_2(\phi)$ for controlling the angle between panels 4 and 5 and introducing angle $\delta_2(\alpha_4, \alpha_5, \theta_2(\phi))$ between bend lines of the equivalent panel (4,5). This is represented on FIGS. 45-46.

Now the number of adjacent panels is four, the new sequence is noted (1, (2,3), (4,5), 6), allowing the following formula for controlling the angle between panel 1 and panel (2,3).

$$\psi=\psi^\epsilon(\alpha_1,\delta_2(\alpha_2,\alpha_3,\theta_1(\phi)),\delta_2(\alpha_4,\alpha_5,\theta_2(\phi)),\alpha_6,\phi)$$

Figure 47:
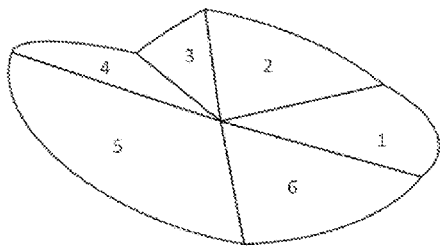
Figure 48:
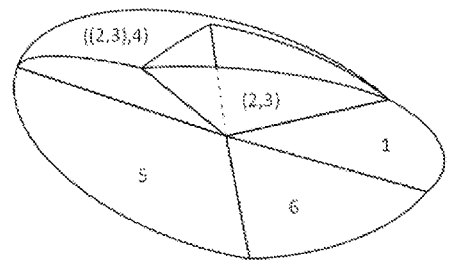

The process of replacing a pair of adjacent panels by an equivalent panel may involve another equivalent panel. For example, after panels 2 and 3 are replaced by an equivalent panel (2,3) like in the previous example, meaning that the sequence is (1, (2,3), 4,5,6), the folding strategy could replace adjacent panels (2,3) and 4 by an equivalent panel, noted ((2,3), 4), as shown on FIGS. 47-48.

The corresponding sequence is (1, (2,3), 4,5,6) and the formula for angle ψ is $$\psi=\psi^\epsilon(\alpha_1,\delta_2(\delta_1(\alpha_2,\alpha_3,\theta_1(\phi)),\alpha_4,\theta_2(\phi)),\alpha_5,\alpha_6,\phi)$$

Angle ψ drives the angle between panel 1 and panel ((2,3), 4).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a folded sheet object of a computer-aided design (CAD) system, comprising the steps of:
   providing (S10) structured data that define panels separated by bend lines, including at least four adjacent panels forming a cycle and separated by concurrent bend lines, with predetermined angles ($\alpha_i$) between successive bend lines;

determining (S20) a control law linking the angles ($\beta_i$) between the adjacent panels of the cycle, as a function of the predetermined angles ($\alpha_i$) between successive bend lines, the control law used as a closed form formula; and adding data that define the control law to the structured data;

wherein the control law fixes, given predetermined values for a number of the angles ($\beta_i$) between pairs of the adjacent panels ($\phi$), the number being equal to a degree of freedom (1) of the cycle, values for the angles ($\beta_i$) between other pairs of the adjacent panels ($\psi$), and further wherein, when the cycle has four adjacent panels, the control law comprises the solution of an equation of the type $F(\psi,\phi)=0$, where $\psi$ and $\phi$ are the angles between successive pairs of the adjacent panels and $\phi$ is predetermined, the angles ($\beta_i$) between the two other pairs of adjacent panels of the cycle stemming from said solution, the angles ($\beta_i$) between the two other pairs of adjacent panels of the cycle being directly computed from $\Psi$ and $\phi$;

wherein the equation is:

$$F(\psi, \phi) = k_1 - k_2\cos\psi + k_3\cos\psi\cos\phi + k_4\cos\phi - \sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1\ldots 4)}$ are the predetermined angles ($\alpha_i$) between successive bend lines, where $\psi$ is the angle between the pair of the adjacent panels corresponding to $\alpha_1$ and $\alpha_2$, and $\phi$ is the angle between the pair the panels corresponding to $\alpha_1$ and $\alpha_3$.

2. The method of claim 1, wherein, when the cycle has more than four panels, determining the control law comprises:

partitioning the panels into four groups; and for each group which comprises at least two panels, determining a virtual panel that forms a cycle with the panels of the group, thereby forming a virtual cycle of four adjacent panels that each correspond to a respective group, the virtual panel being a theoretical panel that would form a cycle of adjacent panels with the panels of the group; and the control law comprises the solution of equation F defined for the virtual cycle.

3. The method of claim 2, wherein, when the cycle has more than four panels and a degree of freedom higher or equal to 2, at least one angle ($\theta$) between a pair of adjacent panels is controlled by a variation law depending on the angle ($\phi$) between another pair of adjacent panels.

4. The method of claim 1, further comprising:

obtaining the folded sheet object based on the data added to the structured data.

5. The method of claim 4, further comprising simulating the folding of the folded sheet object by:

providing (S30) predetermined values for a number of the angles ($\beta_i$) between pairs of the adjacent panels ($\phi$); and determining (S40) values of the other angles ($\beta_i$) between pairs of the adjacent panels ($\psi$) with the control law.

6. A non-transitory computer readable medium having recorded thereon structured data representing a folded sheet object, the structured data comprising:

data that define panels separated by bend lines, including at least four adjacent panels forming a cycle and separated by concurrent bend lines, with predetermined angles ($\alpha_i$) between successive bend lines; and data that define a control law linking the angles ($\beta_i$) between the adjacent panels of the cycle, as a function of the predetermined angles ($\alpha_i$) between successive bend lines, the control law using a closed form formula;

wherein the control law fixes, given predetermined values for a number of the angles ($\beta_i$) between pairs of the adjacent panels ($\phi$), the number being equal to a degree of freedom (1) of the cycle, values for the angles ($\beta_i$) between other pairs of the adjacent panels ($\psi$), and further wherein, when the cycle has four adjacent panels, the control law comprises the solution of an equation of the type $F(\psi, \phi)=0$, where $\psi$ and $\phi$ are the angles between successive pairs of the adjacent panels and $\phi$ is predetermined, the angles ($\beta_i$) between the two other pairs of adjacent panels of the cycle stemming from said solution, the angles ($\beta_i$) between the two other pairs of adjacent panels of the cycle being directly computed from $\Psi$ and $\Phi$;

wherein the equation is:

$$F(\psi, \phi) = k_1 - k_2\cos\psi + k_3\cos\psi\cos\phi + k_4\cos\phi - \sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1\ldots 4)}$ are the predetermined angles ($\alpha_i$) between successive bend lines, where $\psi$ is the angle between the pair of the adjacent panels corresponding to $\alpha_1$ and $\alpha_2$, and $\phi$ is the angle between the pair of the adjacent panels corresponding to $\alpha_1$ and $\alpha_3$.

7. A computer program product comprising:

a non-transitory data storage medium having recorded thereon program code causing a computer to design a folded sheet object of a computer-aided design (CAD) system; and the program code including instructions causing the computer to:

provide (S10) structured data that define panels separated by bend lines, including at least four adjacent panels forming a cycle and separated by concurrent bend lines, with predetermined angles ($\alpha_i$) between successive bend lines;

determine (S20) a control law linking the angles ($\beta_i$) between the adjacent panels of the cycle, as a function of the predetermined angles ($\alpha_i$) between successive bend lines, the control law using a closed form formula; and add data that define the control law to the structured data;

wherein the control law fixes, given predetermined values for a number of the angles ($\beta_i$) between pairs of the adjacent panels ($\phi$), the number being equal to a degree of freedom (1) of the cycle, values for the angles ($\beta_i$) between other pairs of the adjacent panels ($\psi$), and further wherein, when the cycle has four adjacent panels, the control law comprises the solution of an equation of the type $F(\psi, \phi) = 0$, where $\psi$ and $\phi$ are the angles between successive pairs of the adjacent panels and $\phi$ is predetermined, the angles ($\beta_i$) between the two other pairs of adjacent panels of the cycle stemming from said solution, the angles ($\beta_i$) between the two other pairs of adjacent panels of the cycle being directly computed from $\Psi$ and $\Phi$;

wherein the equation is:

$$F(\psi, \phi) = k_1 - k_2\cos\psi + k_3\cos\psi\cos\phi + k_4\cos\phi - \sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1\ldots 4)}$ are the predetermined angles ($\alpha_i$) between successive bend lines, where $\psi$ is the angle between the pair of the adjacent panels corresponding to $\alpha_1$ and $\alpha_2$, and $\phi$ is the angle between the pair of the adjacent panels corresponding to $\alpha_1$ and $\alpha_3$.

8. The computer program product of claim 7 wherein the program code further includes instructions causing the computer to simulate folding of the folded sheet object by:
providing (S30) predetermined values for a number of the angles ($\beta_i$) between pairs of the adjacent panels ($\phi$);
determining (S40) values of the other angles ($\beta_i$) between pairs of the adjacent panels ($\psi$) with the control law.

9. A CAD system comprising:
a memory; and
a processor coupled to the memory and a graphical user interface, the memory having recorded thereon program code which when executed by the processor:
provides (S10) structured data that define panels separated by bend lines, including at least four adjacent panels forming a cycle and separated by concurrent bend lines, with predetermined angles ($\alpha_i$) between successive bend lines;
determines (S20) a control law linking the angles ($\beta_i$) between the adjacent panels of the cycle, as a function of the predetermined angles ($\alpha_i$) between successive bend lines, the control law using a closed form formula; and
add data that define the control law to the structured data;
wherein the control law fixes, given predetermined values for a number of the angles ($\beta_i$) between pairs of the adjacent panels ($\phi$), the number being equal to a degree of freedom (1) of the cycle, values for the angles ($\beta_i$) between other pairs of the adjacent panels ($\psi$), and further wherein, when the cycle has four adjacent panels, the control law comprises the solution of an equation of the type $F(\psi, \phi)=0$, where $\psi$ and $\phi$ are the angles between successive pairs of the adjacent panels and $\phi$ is predetermined, the angles ($\beta_i$) between the two other pairs of adjacent panels of the cycle stemming from said solution, the angles ($\beta_i$) between the two other pairs of adjacent panels of the cycle being directly computed from $\Psi$ and $\Phi$, wherein the equation is:

$$F(\psi, \phi) = k_1 - k_2\cos\psi + k_3\cos\psi\cos\phi + k_4\cos\phi - \sin\psi\sin\phi$$

with:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and $\alpha_{i(i=1\ldots 4)}$ are the predetermined angles ($\alpha_i$) between successive bend lines, where $\psi$ is the angle between the pair of the adjacent panels corresponding to $\alpha_1$ and $\alpha_2$ and $\phi$ is the angle between the pair of the adjacent panels corresponding to $\alpha_1$ and $\alpha_3$.

10. The CAD system as claimed in claim 9 wherein, when the cycle has more than four panels, determining the control law comprises:
partitioning the panels into four groups; and
for each group which comprises at least two panels, determining a virtual panel that forms a cycle with the panels of the group, thereby forming a virtual cycle of four adjacent panels that each correspond to a respective group; and
wherein the control law comprises the solution of equation F defined for the virtual cycle, the virtual panel being a theoretical panel that would form a cycle of adjacent panels with the panels of the group.

11. The CAD system as claimed in claim 10 wherein, when the cycle has more than four panels and a degree of freedom higher or equal to 2, at least one angle ($\theta$) between a pair of adjacent panels is controlled by a variation law depending on the angle ($\phi$) between another pair of adjacent panels.

12. A computer-implemented method for simulating the folding of a folded sheet object of a computer-aided design (CAD) system that represents a planar sheet that forms a package after folding, comprising the steps of:
providing structured data that define panels separated by bend lines, including at least four adjacent panels forming a cycle and separated by concurrent bend lines, with predetermined angles between successive bend lines;
determining a control law linking the angles between the adjacent panels of the cycle, as a function of the predetermined angles between successive bend lines;
providing predetermined values for a number of the angles between pairs of the adjacent panels; and
determining values of the other angles between pairs of the adjacent panels with the control law;
the control law fixing, given predetermined values for a number of the angles between pairs of the adjacent panels equal to the degree of freedom of the cycle, values for the angles between other pairs of the adjacent panels;
the control law comprising, when the cycle has four adjacent panels, the solution of an equation of the type $F(\psi,\phi)=0$, where $\psi$ and $\phi$ are the angles between successive pairs of the adjacent panels and $\phi$ is predetermined, the angles ($\beta_i$) between the two other pairs of adjacent panels of the cycle stemming from said solution, the angles ($\beta_i$) between the two other pairs of adjacent panels of the cycle being directly computed from $\Psi$ and $\Phi$;

the equation being:

$$F(\psi,\phi) = k_1 - k_2\cos\psi + k_3\cos\psi\cos\phi + k_4\cos\phi - \sin\psi\sin\phi,$$

wherein:

$$k_1 = \frac{\cos\alpha_1\cos\alpha_2\cos\alpha_4 - \cos\alpha_3}{\sin\alpha_2\sin\alpha_4}$$

$$k_2 = \cot\alpha_4\sin\alpha_1$$

$$k_3 = \cos\alpha_1$$

$$k_4 = \cot\alpha_2\sin\alpha_1$$

and wherein $\alpha_{i(i=1\ldots 4)}$ being the predetermined angles between successive bend lines, where $\psi$ is the angle between the pair of the adjacent panels corresponding to $\alpha_1$ and $\alpha_2$, and $\phi$ is the angle between the pair of the adjacent panels corresponding to $\alpha_1$ and $\alpha_3$.

* * * * *

UNITED STATES PATENT AND TRADEMARK OFFICE
CERTIFICATE OF CORRECTION

PATENT NO. : 9,703,903 B2  
APPLICATION NO. : 14/308029  
DATED : July 11, 2017  
INVENTOR(S) : Jean-Francois Rameau and Pascal Hebrard Page 1 of 1

It is certified that error appears in the above-identified patent and that said Letters Patent is hereby corrected as shown below:

In the Claims

In Claim 1, Column 19, Line 40, after "the pair" insert --of-- and before "panels" insert --adjacent--

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*